United States Patent [19]

Li et al.

[11] Patent Number: 5,571,887

[45] Date of Patent: Nov. 5, 1996

[54] SYNTHETIC BIODEGRADABLE POLYMER FROM O-CRESOL

[75] Inventors: Li-Xia Li, Atlanta, Ga.; Patrick J. Oriel, Midland, Mich.; Eric A. Grulke, Lexington, Ky.

[73] Assignee: Board of Trustees operating Michigan State University, East Lansing, Mich.

[21] Appl. No.: 492,318

[22] Filed: Jun. 19, 1995

Related U.S. Application Data

[63] Continuation of Ser. No. 236,580, May 2, 1994.

[51] Int. Cl.$^6$ .................................................... C08G 65/38

[52] U.S. Cl. .......................... 528/217; 528/212; 528/214; 528/215; 528/216; 524/700

[58] Field of Search ................................. 528/212, 214, 528/215, 216, 217; 524/700

[56] References Cited

U.S. PATENT DOCUMENTS 4,440,923  4/1984  Bartman et al. ...................... 528/216

OTHER PUBLICATIONS

A. S. Hay, Polym. Eng. Sci., 16, 1–10 (1976).
A. S. Hay, et al., Polym. Lett., 3, 887–889 (1965).

Primary Examiner—Samuel A. Acquah
Attorney, Agent, or Firm—Ian C. McLeod

[57] ABSTRACT

A new thermoplastic homopolymer of o-cresol which is a poly(2-methylphenylene oxide) having a high molecular weight distribution is described. The polymer is prepared using a 2 and/or 6 substituted pyridine catalyst to the molecular weight distribution. The homopolymer can be blended with other thermoplastic polymers. The homopolymer is rapidly biodegraded, particularly in soil containing soil microorganisms.

8 Claims, 4 Drawing Sheets

SYNTHETIC BIODEGRADABLE POLYMER FROM O-CRESOL

This is a continuation of copending application Ser. No. 08/236,580 filed on May 2, 1994.

BACKGROUND OF THE INVENTION (1) Field of the Invention

The present invention relates to a poly(2-methyl phenylene oxide) homopolymer prepared from o-cresol which is biodegradable. In particular, the present invention relates to a homopolymer which has good blending properties with hydrophobic polymers. In soil experiments, the homopolymer degraded readily.

(2) Description of Related Art

Because landfill approaches to solid-waste disposal are both inefficient and increasingly expensive, traditional approaches to plastic utilization need to be replaced with better strategies. Although increased plastics recycling will occur in the future, it is likely that logistics and economics will limit the kinds and amount of plastics to be recycled and that disposal of plastics, particularly those used for packaging of food and household wastes, will continue at high volumes. Current plastic packaging materials are sophisticated blends, laminates, or mixtures that have specific mechanical, barrier, and processing properties for their applications.

There currently are three mechanisms of polymer degradation by environmental causes: photodegradable, chemically degradable, and biodegradable. There are three categories of biodegradable polymers: immiscible blends of a biodegradable polymer such as starch in a thermoplastic polymer; single-phase systems of hydrolyzable homopolymers and copolymers, and soluble polymers that can dissolve in water and presumably might then be attacked by microorganisms. To date, most single-phase biodegradable polymers have hydrolyzable linkages, including ester and amide types (S. J. Huang, in Encyclopedia of Polymer Science and Engineering, H. F. Mark et al., Eds., Wiley-Interscience, New York, Vol. 2, pp. 220–242 (1985)). Because of their polarity, these polymers do not blend well with the more hydrophobic polymers such as polystyrene and polypropylene typically used in packaging applications.

Development of hydrophobic polymers that can be biodegraded can lead to alternative systems and strategies for packaging materials. The polyphenylene ether family of polymers are miscible with other polymers, particularly those containing aromatic rings. The aromatic component of these polymers leads to their wetting of other synthetic polymers in laminate applications or miscible blends in other applications.

The problem is to develop compatible, highly biodegradable polymers which have a high molecular weight range. To date polymers based upon o-cresol have a molecular weight distribution of about 1000 up to 100,000, which is too narrow.

U.S. Pat. No. 3,383,435 to Cizek describes a blend of styrene resin and a polyphenylene ether. U.S. Pat. No. 3,306,875 to Hay et al describes the preparation of polyphenylene ethers using tertiary amine metal complexes as catalysts. These polymers have the narrow molecular weight distribution.

OBJECTS

It is therefore an object of the present invention to provide a high molecular weight homopolymer of o-cresol which has a molecular weight distribution and which has good physical characteristics and is suitable for forming plastic products.

It is further an object of the present invention to provide homopolymers which blend well with hydrophobic thermoplastic polymers which are used for a variety of plastic products.

Further still, it is an object of the present invention to provide homopolymers which are biodegradable, particularly in soil environments, such as landfills.

Finally, it is an object of the present invention to provide homopolymers which are relatively inexpensive to produce and which are recyclable.

These and other objects will become increasingly apparent by reference to the following description and the drawings.

DESCRIPTION OF PREFERRED EMBODIMENTS

Figure 1:
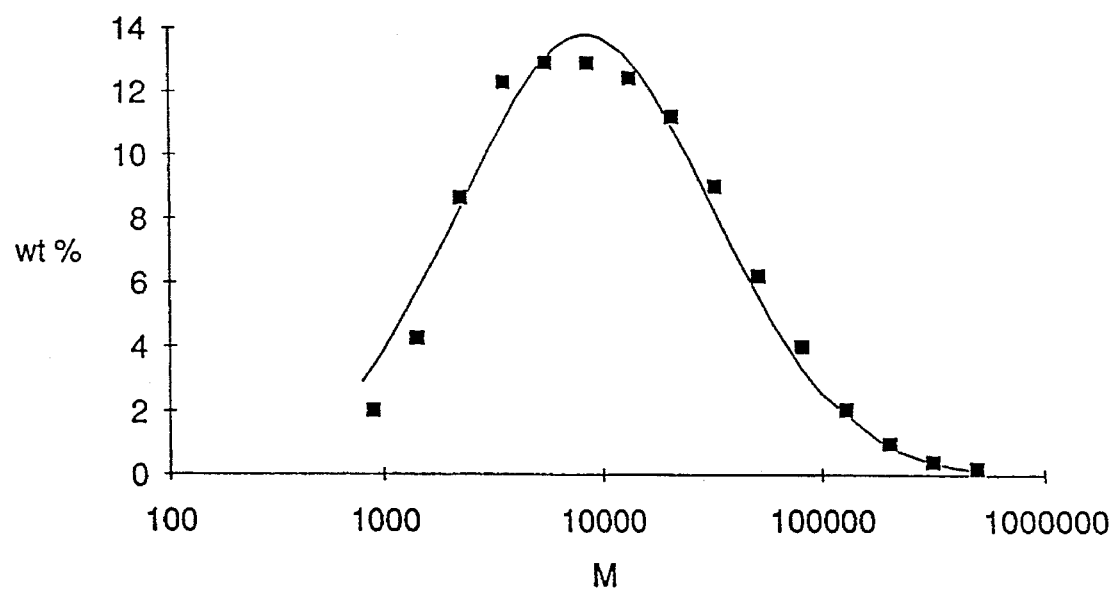
FIG. 1 is a graph showing the molecular weight distribution for 2-methylphenylene oxide (PMPO) as polymerized using the 2(2-isopropoxyethyl) pyridine cocatalyst. Solid squares: data. Solid curve: eq. (1) with $\sigma=1.34$ and $M_m=8500$.

The present invention relates to a thermoplastic poly(2-methyl phenylene oxide) homopolymer having an average molecular weight of between about 5000 and 500,000 and a molecular weight distribution between about 1,000 and 700,000 and is biodegradable.

Further, the present invention relates to a process for producing a thermoplastic poly(2-methyl phenylene oxide) or poly(2-dimethylphenylene oxide) homopolymer which comprises: reacting in a reaction mixture a compound selected from the group consisting of o-cresol and 2,6-dimethylphenol, a catalytic amount of a copper complex of a 2 or 6 position substituted aromatic amine wherein one substituent, if present, contains 2 to 4 carbon atoms and the other substituent contains 6 to 10 carbon atoms in an organic solvent in the presence of oxygen in the solvent while maintaining the reaction mixture at a temperature below the boiling point of the mixture to form the homopolymer; and separating the homopolymer from the reaction mixture. The present invention also relates to the novel complex with a copper salt.

A "thermoplastic polymer" is one which melts (TM) upon heating rather than degrading. Generally these polymers are crystalline at lower temperatures and become amorphous at the glass transition temperature (Tg). It is desirable to have a relatively high Tg so that the polymer remains useable at elevated temperatures. Preferably the homopolymers of the present invention have a Tg of between about 95° and 200°.

The homopolymer from o-cresol can be admixed with other thermoplastic polymers, such as polystyrene and polypropylene, particularly those which are hydrophobic. The term "hydrophobic" means that the polymer is not wet by water. Homopolymers containing styrene or substituted styrene monomers, copolymers containing styrene (such as styrene-acrylonitrile, styrene-butadiene copolymers and styrene-acrylonitrile-butadiene terpolymers) can be used. Polymers which can be admixed with the homopolymers from o-cresol are for instance, polystyrenes, polysiloxanes, polycarbonates, polyolefins, polysulfones, polyamide, and related copolymers.

In the process of the present invention, the o-cresol is reacted in the presence of oxygen which removes a hydrogen from the hydroxyl group and the resulting cresoxide (2-methyl phenoxide) reacts with itself to form the homopolymer. In the past, it has been impossible to avoid forming carbon to carbon bonds between the aromatic rings and thus the molecular weight range of the homopolymers were narrow. In order to avoid this problem, the process of the present invention uses a copper salt (cuprous ($Cu^{+1}$) or cupric ($Cu^{+2}$)) and a pyridine ring containing compound. Such compounds are: pyridine, 5-butyl-2-methylpyridine, and 2-(2-isopropoxyethyl)pyridine, which was preferred. The molecular weight distribution changed with the ratio of copper to pyridine ring containing compound and a preferred ratio was a 1 to 1 molar ratio which resulted in a copper amine complex. Other amine (1,10-phenanthroline, copper phthalocyanine and neocuproine) with copper were ineffective.

The reaction is conducted in a solvent for the o-cresol which does not react with the oxygen, the catalyst or the o-cresol and in which the polymer product is soluble. Toluene is preferred; however, other aromatic solvents can be used. The product is separated from the reaction mixture by precipitating the homopolymer with a non-solvent for the polymer such as methanol or by a solvent extraction method.

The compound 2-(2-isopropoxyethyl) pyridine is preferred as the catalyst complexed as a cuprous salt. Other 2 and/or 6 position substituted pyridines with alkyl, alkoxy, carboxylic or aromatic groups which together contain 6 to 14 carbon atoms wherein one of the groups is bulky and, if present, the other group is relatively less bulky. The preferred compounds are 2-(alkoxyalkyl) pyridines where alk and alkyl together contain 6 to 10 carbon atoms.

The polymer provides the attractive engineering properties of poly(2,6-dimethyl phenylene oxide) (PDMPO), but with increased biodegradability due to the decreased methyl substitution on the ring to facilitate biodegradation. In addition, its monomer, o-cresol, is known to be biodegradable (J. A. Buswell, J. Bacteriol., 124, 1077–1083 (1975)).

Simple aromatic compounds are degraded by oxidative ring cleavage following hydroxylation (M. L. Rochkind-Dubinsky, et al., Microbial Decomposition of Chlorinated Aromatic Compounds, Marcel Dekker, New York, (1987)).

EXAMPLE 1

Materials

O-Cresol was obtained from Sigma Chemical, St. Louis, Mo., and used without purification. 2,6-dimethyl phenol was obtained from Aldrich Chemical (Milwaukee, Wis.) and was used without purification. Polymerization solvents (pyridine, toluene, chloroform, and methanol) were obtained as reagent grade. The catalyst system was cuprous chloride complexed to 2,2-isopropoxy ethyl) pyridine.

Polymer Synthesis

PDMPO was prepared by the process of Hay (A. S. Hay, Polym. Eng. Sci., 16, 1–10 (1976)). This process is polymerization by oxidative coupling. The synthesis of low molecular weight PMPO has been reported previously, but attempts to obtain higher molecular weight polymers were thwarted by formation of low molecular weight products and carbon-carbon linked side products (A. S. Hay, et al., Polym. Lett., 3, 887–889 (1965)). High molecular weight polymer was prepared with a new catalyst system of CuCl with 2,2-isopropoxy ethyl pyridine. This system reduced carbon-carbon coupling at the 6-position on the aromatic ring by using bulky coordination groups on the copper catalyst. The reaction mixture of the catalyst system (3 g CuCl in 50 mL 2-(2-isopropoxy ethyl) pyridine diluted in 150 mL toluene was purged with pure oxygen at room temperature for 10–15 minutes. Powdered $MgSO_4$ (18 g) was added to scavenge for residual water. A solution of o-cresol in toluene (32.4 g o-cresol in 200 mL toluene) was added dropwise with a funnel over several minutes to prevent a rise in reaction temperature above 50° C. The reaction was continued for 2 hours. The temperature dropped to 25° C. and the polymer product was precipitated by pouring the reaction mixture into 2 L of methanol (2000 ml). The polymer product was separated by filtration and dried at room temperature.

Molecular Weight Distribution

Molecular weight distributions for PDMPO and PMPO were determined by gel permeation chromatography using a Waters Chromatographic system. An Ultrastyragel™ (Waters Associates, Milford, Mass.) column ($10^4$ Å pores) was calibrated with a series of polystyrene standards (MW= 580, 1820, 2450, 5050, 11,600, and 21,900) and one commercial sample having a molecular weight typical of commercial products (MW=244,000; Scientific Polymer Products) Sample concentrations of 0.25 wt % in chloroform were injected and a flow rate of 1.5 mL/min was used. The column calibration curve showed the expected linear relationship between the natural logarithm of molecular weight and elution time (or volume). GPC response curves for both poly(phenylene oxides) were converted directly to molecular weight distributions using the calibration curve.

Thermal Transitions

The thermal transitions of powder and film samples were determined with a DuPont 9900 thermal analyzer (Wilmington, Del.) using differential scanning calorimetry (DSC 910 attachment). Reported values of thermal transitions are those of the second heats due to the residual stresses in the materials made by rapid precipitation and cast film techniques.

Microscopy

Optical microscopy of film samples was done using a microscope at magnifications of 200× and 500×. Etched scales were used to establish length dimensions. A Jeol T-330 (Japan) scanning electron microscope was used to determine the particle size of precipitated polymer samples. Powders were placed on mounting stubs, coated with gold, and examined in the instrument.

Polymer Biodegradation

Polymer biodegradation studies utilized 350 g of loamy soil sampled from a tilled field at Michigan State University. The soil was sieved through a 2 mm screen and added to a 1 L Erlenmeyer flask. The polymer (1.75 g) was ground finely with a mortar and pestle and mixed into the soil. The soil mixture was adjusted to 5 wt % water saturation and incubated at room temperature. Samples (50 g) were taken and soil moisture was adjusted at 10 day intervals. The samples were extracted three times with chloroform (50 mL each), and the solvent samples were pooled to analyze for residual polymer.

In another method, 350 g soil was sieved through a 2-mm screen and added to 1,000 ml Erlenmeyer flask, 1.75 g polymer ground and thoroughly mixed into the soil. The soil mixture was preserved at room temperature. At 10 day intervals, 50 g soil mixture withdrawal and was extracted with chloroform three times. The chloroform phase was added to between five and six times the volume methanol to precipitate the polymer, the precipitate was recovered by centrifuging and, the precipitate was dried and weighed.

Material Properties of PMPO

A typical molecular weight distribution for PMPO is shown by the solid points in FIG. 1. the molecular weight averages for this sample were $M_n$=5400 and $M_w$=23,100 and the polydispersity was 4.27. Several common molecular weight distributions were fit to the data to determine an empirical model for this polymer. The best fit was given by the Wesslau distribution (L. H. Peebles, Molecular Weight Distributions in Polymers, Interscience, New York, (1971)), one of several log normal distributions:

$$\omega(M) = \frac{1}{\sqrt{2\pi\sigma^2}} \frac{1}{M} \exp\left[\frac{-(\ln M - \ln \overline{M}_n)^2}{2\sigma^2}\right]$$

wherein w(m) is the weight frequency of the distribution, M, the molecular weight; σ, a measure of the breadth of the distribution; and $M_m$, the mean of the sample. The Wesslau model coefficients were σ=1.34 and $M_m$=8500.

The Wesslau model parameters were estimated by minimizing the least squares error between the data and the model. The differential distributions presented here have not been normalized. The continuous curve in FIG. 1 corresponds to the model predictions. The Wesslau model describes the data well, but slightly over predicts the weight frequency near the sample mean and shifts the maximum of the differential distribution curve to higher molecular weight. The model fit was considered sufficient to identify samples that might have significantly different distributions.

Figure 2:
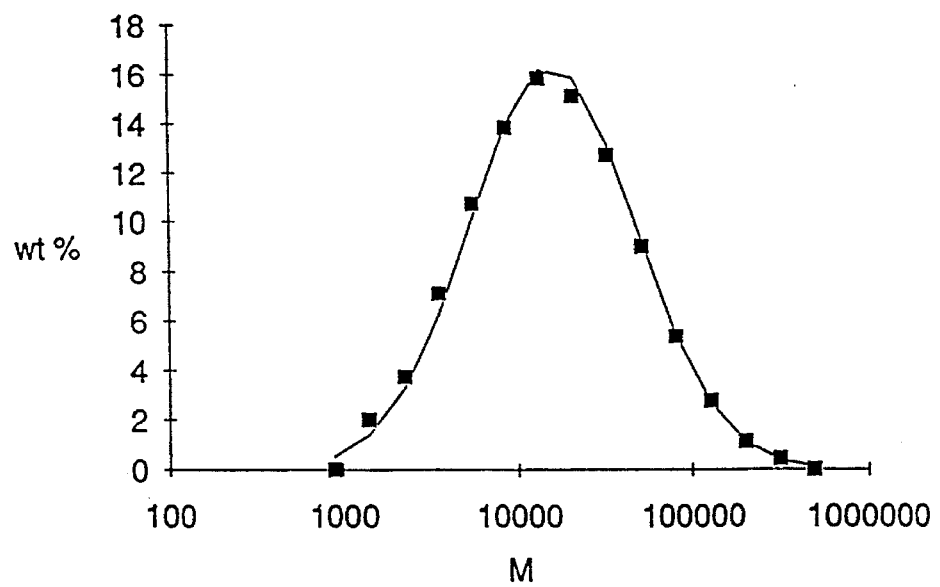
FIG. 2 is a graph showing the molecular weight distribution for 2,6-dimethylphenylene oxide (PDMPO) as polymerized using the pyridine cocatalyst of FIG. 1. Solid squares: data. Solid curve: eq. (1) with $\sigma=1.14$ and $M_m=15,000$.

FIG. 2 shows the molecular weight distribution for PDMPO made in this study. It also is well described by a Wesslau distribution with σ=1.14 and $M_m$=15,000.

The PMPO made by this procedure consisted of agglomerated particles of low bulk density. The agglomerates are roughly spherical with diameters between 5 to 10 microns. SEM analysis showed that primary particles about 0.25 microns in diameter formed porous particles. The morphology of the particles probably can be controlled by the temperature and solvent choice of the precipitation process.

Figure 3:
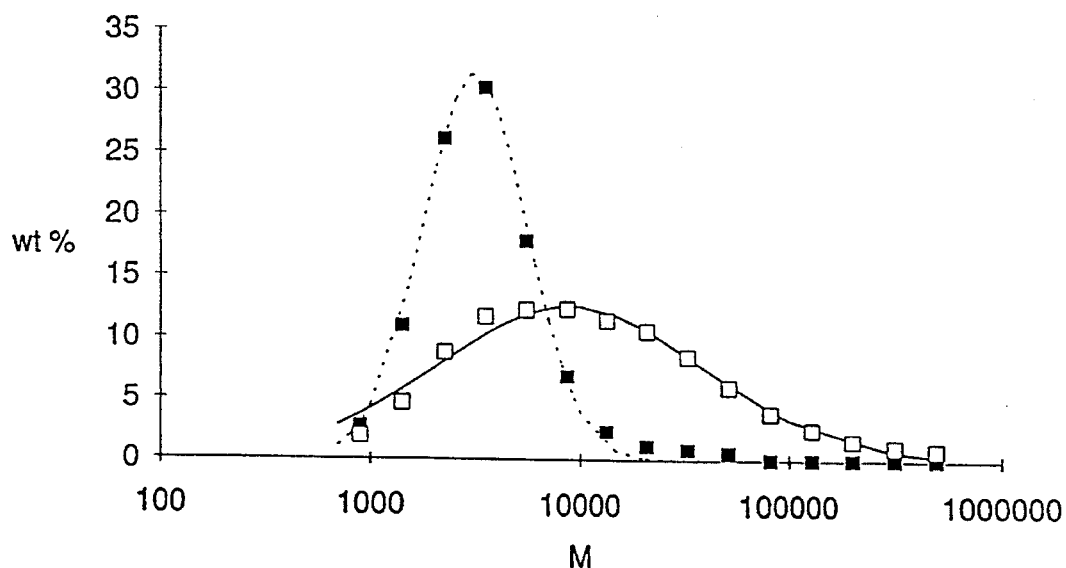
FIG. 3 is a graph showing a comparison of PMPO molecular weight distributions for the two cocatalysts. Pyridine cocatalyst: solid squares and dashed curve. 2(2-Isopropoxy ethyl pyridine): open squares and solid curve. Distribution coefficients given in Table 1.

The improvement in molecular weight obtained by using 2(2-isopropoxy ethyl) pyridine is shown in FIG. 3. With pyridine as the cocatalyst, the weight-average molecular weight of the product was about 4500. This represents an average degree of polymerization of 45, suggesting that long chains are not formed as quickly as with the preferred cocatalyst. The product made in pyridine was fit by a Wesslau distribution as well. The difference in the distribution coefficients suggest that the two materials shown in FIG. 3 are quite different. Molecular weight distribution parameters for these materials are shown in Table I.

TABLE I

Comparison of Molecular Weight Distribution Parameters for PMPO Samples Prepared with Different Cocatalysts

| Distribution Parameter | Cocatalyst | |
|---|---|---|
| | Pyridine | 2,2-Isopropoxy Ethyl Pyridine |
| $\overline{M}_m$ | 3100 | 9000 |
| σ | 0.57 | 1.48 |
| $\overline{M}_n$ | 2800 | 3800 |
| $M_w$ | 4500 | 25,400 |
| $M_w/\overline{M}_n$ | 1.61 | 6.67 |

The thermal properties of PMPO should be similar to those of PDMPO, which has a $T_g$ of 225° C. and a $T_m$ of 267° C., (F. E. Karasz and J. M. O'Reilly, Polym. Lett., 3, 561–563 (1965)). Differential scanning calorimetry of PMPO suggests a $T_g$ near 180° C., although further work needs to be done to verify that solvents and the fine structure of the solids are not affecting the interpretation of the data (R. Boyer and A. Burolo, private communication (1991)).

EXAMPLE 2

Figure 4:
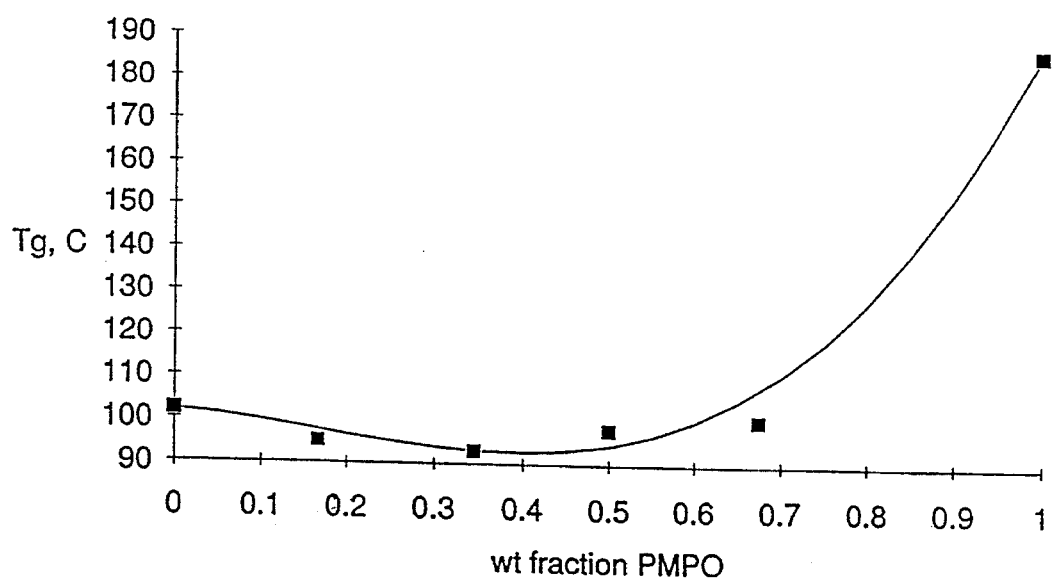
FIG. 4 is a graph showing the glass transition temperatures of cast film blends of polystyrene and PMPO. $T_g$ determined by the second heat of differential scanning calorimetry.

PDMPO is known to be soluble in polystyrene and is dissolved in a polystyrene-polybutadiene blend as Noryl®, a General Electric product. The miscibility of PMPO and polystyrene was investigated with film blends cast from chloroform. Mixtures of these polymers in chloroform showed phase separations at some polymer ratios, but gave clear cast films that were uniform in color. The cast films are flexible for compositions up to 50 wt % PMPO and seem mechanically similar to polystyrene, although no tensile or burst test data have been obtained. Examination of the films by optical microscopy shows no obvious phase separation at the detection limit of the equipment (about 1–2 microns). In addition, the films appeared to have a single glass transition temperature by DSC. FIG. 4 shows the blend $T_g$ as a function of PMPO weight fraction. The data are shown as points and the curve represents a Redlich-Kister type model. The thermal and optical properties of cast films seem to be consistent with a miscible polymer blend.

EXAMPLE 3

Figure 5:
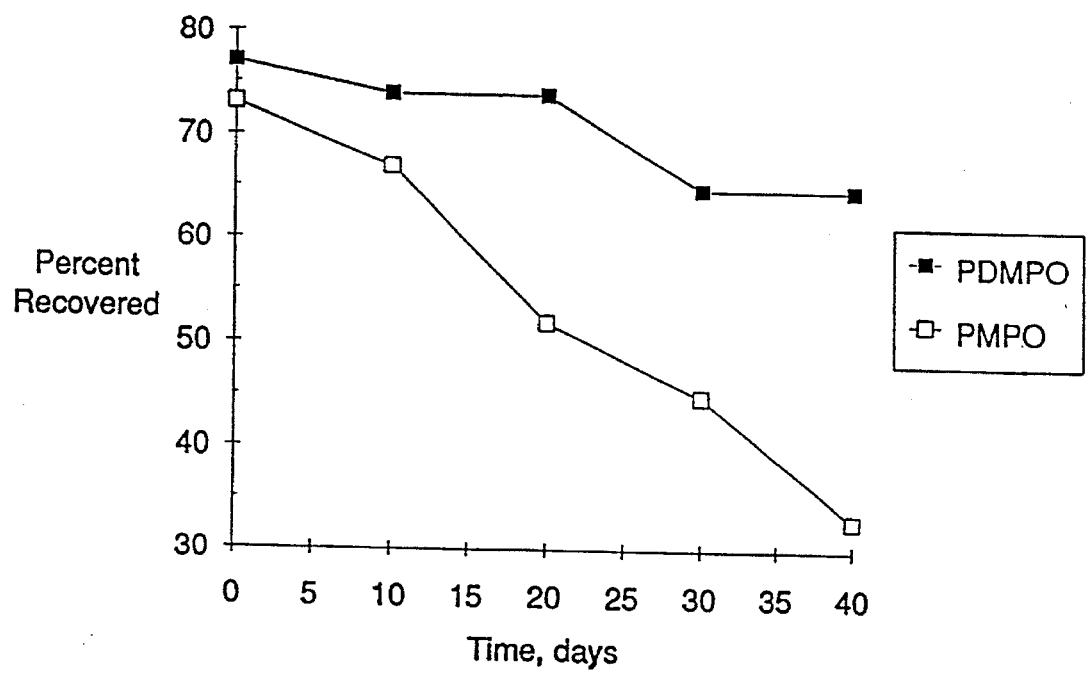
FIG. 5 is a graph showing the polymer recovered by solvent extraction from soil after degradation at room temperature.

FIG. 5 compares the amounts of PDMPO and PMPO recovered from the soil as a function of degradation time. Complete recovery was not achieved for either polymer. The percent recovered initially (day 0) represents typical recoveries of the chloroform extraction procedure. The PDMPO does not show large losses, suggesting that its biodegradation rate is low. By contrast, the PMPO recovered from the soil dropped to 50% of its initial value after 40 days, suggesting that the material biodegraded. This finding was reproduced in independent experiments.

Figure 6:
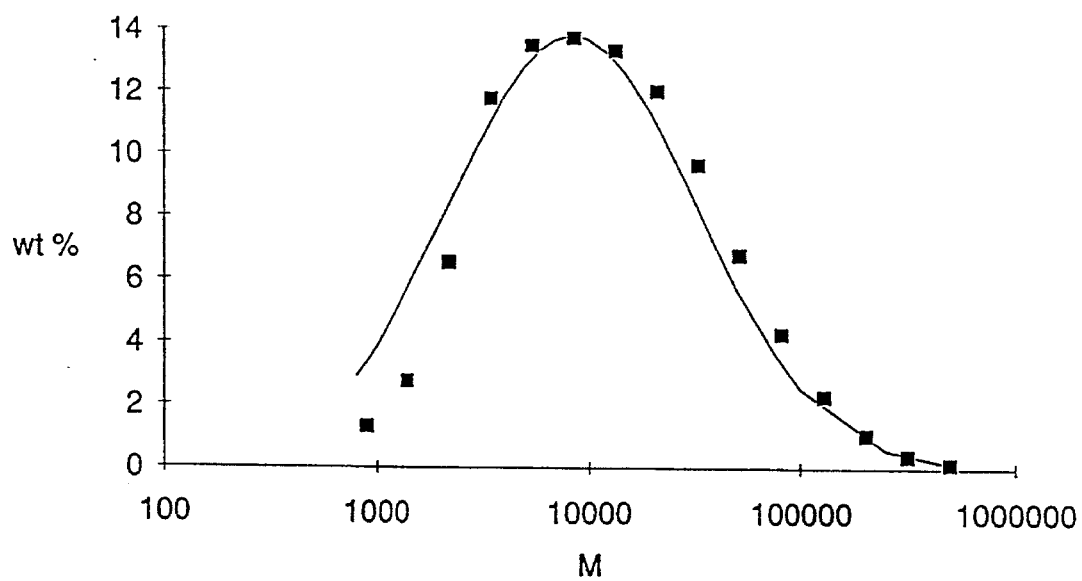
FIG. 6 is a graph showing the molecular weight distribution of PMPO recovered from soil after 40 days of degradation. Solid squares: data. Solid curve: eq. (1) with the distribution parameters of the original material. Best fit values are given in Table II.

FIG. 6 shows the molecular weight distribution of a sample of PMPO that was degraded in soil for 40 days. It has $M_n$=6200 and $M_w$=24,100 and a polydispersity of 3.84. Its Wesslau parameters were $\sigma=1.30$ and $M_m=10,500$. The solid curve shown in FIG. 6 is based on the Wesslau parameters fit to the PMPO sample before degradation. There seems to be a slight shift of the degraded sample distribution to higher molecular weights. However, the differences in the curve parameters is modest (see Table II) and probably is within the error of the method.

TABLE II

Comparison of Molecular Weight Distribution Parameters for PMPO and PDMPO Samples before and after Degradation

| Distribution Parameter | PMPO Initial | PMPO 40 Day | PDMPO Initial | PDMPO 40 Day |
|---|---|---|---|---|
| $\overline{M_m}$ | 8,500 | 10,500 | 15,000 | 20,500 |
| $\sigma$ | 1.34 | 1.30 | 1.14 | 1.14 |
| $\overline{M_n}$ | 5,400 | 6,200 | 8,900 | 7,500 |
| $\overline{M_w}$ | 23,100 | 24,100 | 28,000 | 30,300 |
| $\overline{M_w}/\overline{M_n}$ | 4.27 | 3.84 | 3.15 | 4.02 |

Figure 7:
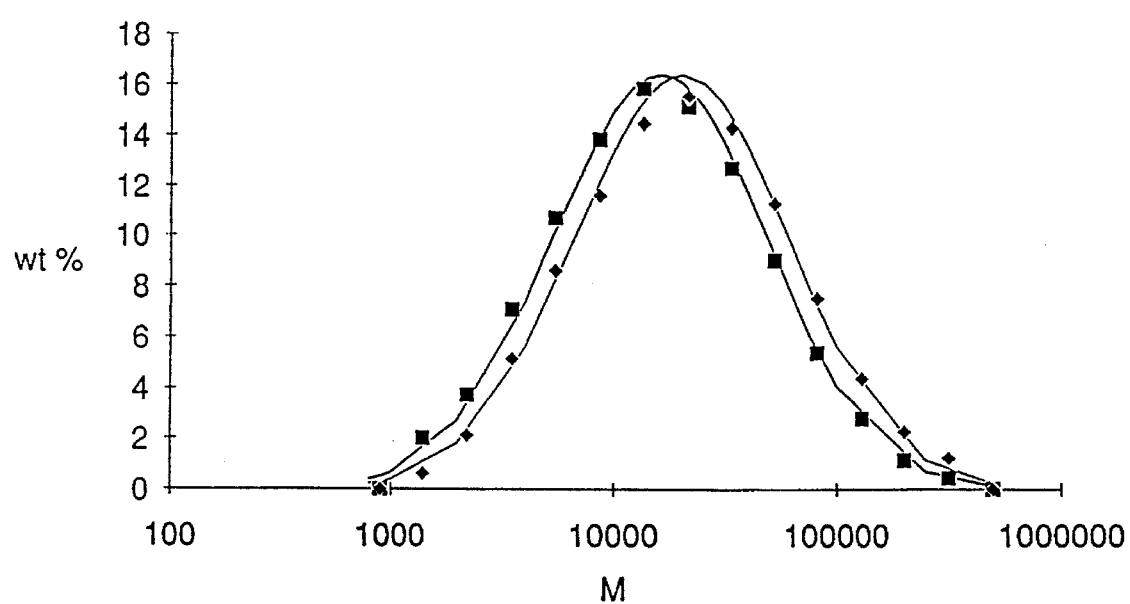
FIG. 7 is a graph showing a comparison of molecular weight distributions of PDMPO as polymerized and after soil incubation. Solid squares: initial PDMPO. Solid diamonds: incubated PDMPO. Distribution parameters are given in Table II.

The similarity of the Wesslau parameters and the curves themselves suggest that the polymer recovered from the soil has the same molecular weight distribution as that of the initial sample. FIG. 7 shows the distributions for the PDMPO samples. There are no significant differences between these molecular weight distributions.

Since the total amount of polymer recovered from the soil under degradation conditions was less than that of the control, it is likely that degradation of PMPO occurs independently of its molecular weight. The strategies used by bacteria for biodegrading synthetic polymers have not been carefully explored. There are, however, studies of bacteria attacking natural polymeric materials, such as cellulose, which are too large for introduction into the cell. Two strategies appear to be utilized by cellulolytic microbes (R. Lamed and E. A. Bayer, in Advances in Applied Microbiology, A. Laskin, Ed., Academic Press, New York, Vol. 33, p. 1 (1988)). The first (Type I), exemplified by fungi and certain bacteria, consists of secretion of a battery of extracellular enzymes into the surrounding medium, resulting in cellulose degradation to oligo- or mono-saccharides that can be introduced into the cell for further degradation and utilization as carbon and energy sources. The second (Type II) has been elucidated more recently for certain cellulolytic bacteria, in which localized areas on the cell exterior called "cellulosomes" participate in binding the bacterium to the cellulose surface with degradation of the proximal cellulose with associated enzymes. Binding of the bacterium to the substrate is a strategy that conserves enzyme and prevents loss of enzyme products to competing organisms in the immediate environment. The data of FIGS. 5 and 6 are consistent with a Type II mechanism involving cell binding with local biodegradation in the region of contact.

This example shows that PMPO readily degrades in soil. PMPO degrades at higher rates than does PDMPO, which is consistent with the hypothesis that methyl groups in both the 2 and 6 ring positions hinder biodegradation. The lack of change in the molecular weight distribution of PMPO after biodegradation suggests a cell-associated degradation mechanism.

It is intended that the foregoing description be only illustrative of the present invention and that the present invention be limited only by the hereinafter appended claims.

We claim:

1. A process for producing a thermoplastic poly(2-methyl phenylene oxide) or poly(2-dimethylphenylene oxide) homopolymer which comprises:

(a) reacting in a reaction mixture o-cresol, a catalytic amount of a copper complex with a 2-(2-isopropyl(oxyethyl)pyridine and an organic solvent in the presence of oxygen in the solvent while maintaining the reaction mixture at a temperature of less than the boiling point of the mixture to form the poly(2-methyl phenylene oxide); and (b) separating the homopolymer from the reaction mixture, wherein the homopolymer produced has a weight average molecular weight of between about 5,000 and 500,000 and a molecular weight distribution between about 1,000 and 700,000.

2. The process of claim 1 wherein the o-cresol in the solvent is added dropwise to the copper complex in the solvent.

3. The process of claim 1 wherein the temperature is less than the boiling point of the mixture.

4. The process of claim 1 wherein the polymer has an average molecular weight of between about 5,000 and 500,000 and a molecular weight distribution between about 1,000 and 700,000 and is biodegradable.

5. The process of claim 1 wherein the organic solvent is toluene.

6. The process of claim 1 wherein the temperature is less than 50° C.

7. The process of claim 1 wherein water formed in the reaction mixture is scavenged.

8. A product of the process of claim 1.

\* \* \* \* \*